Dec. 18, 1951     N. E. WASHBURN     2,578,869
ELECTRONIC MEASURING DEVICE
Filed July 10, 1946                                            2 SHEETS—SHEET 1
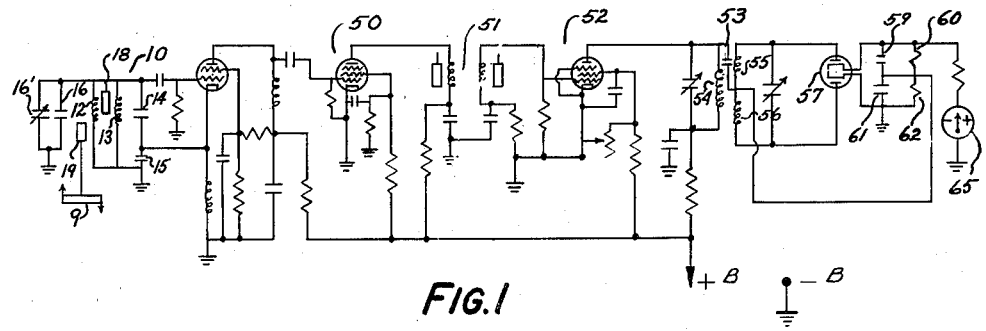
FIG.1
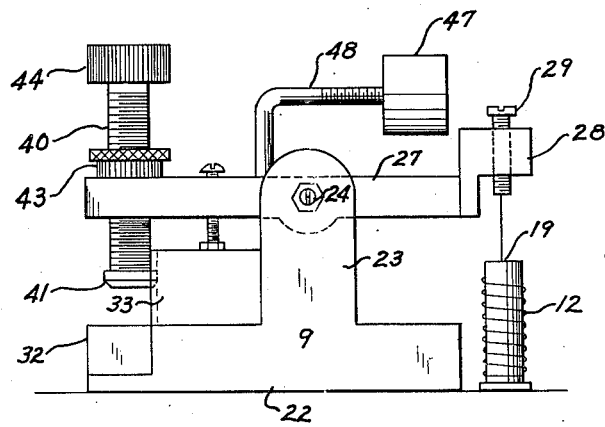
FIG.2
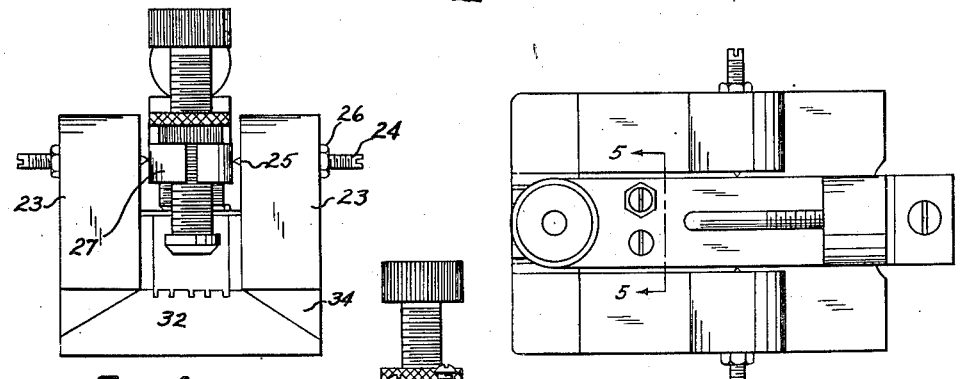
FIG.4                  FIG.3
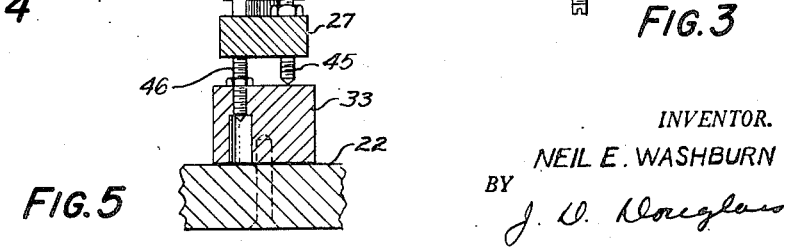
FIG.5
INVENTOR.
NEIL E. WASHBURN
BY
J. D. Douglas

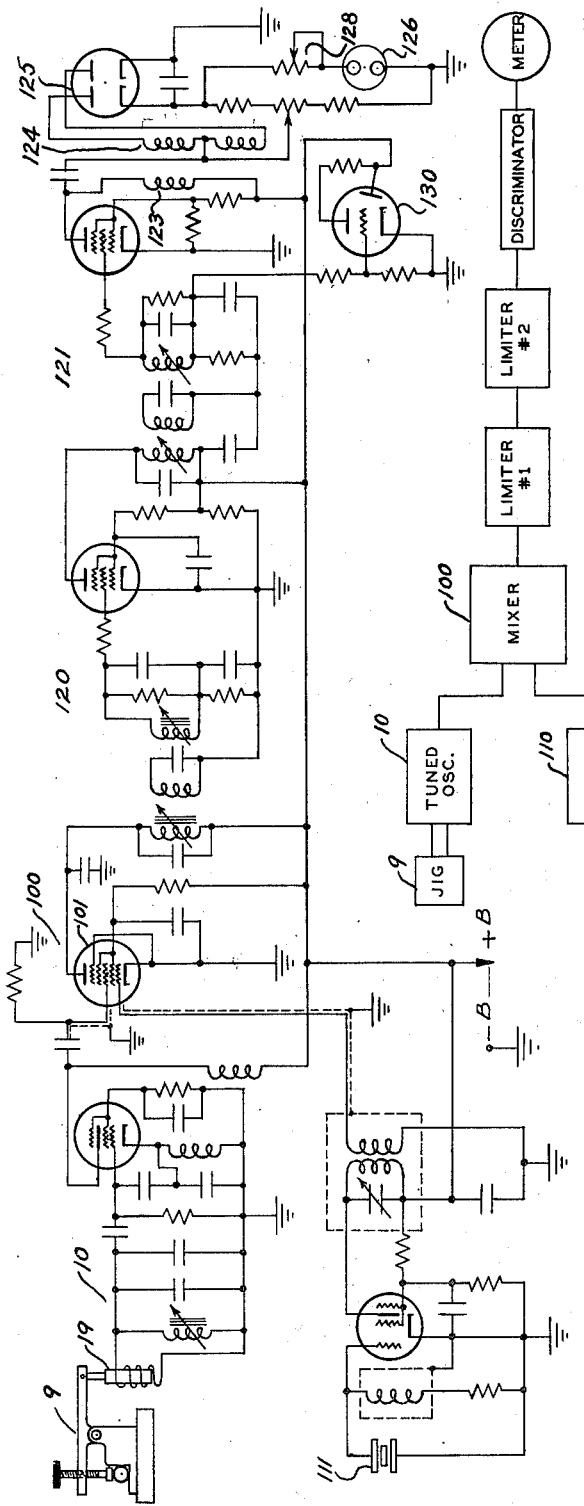

Patented Dec. 18, 1951

2,578,869

UNITED STATES PATENT OFFICE 2,578,869

ELECTRONIC MEASURING DEVICE

Neil E. Washburn, Chicago, Ill., assignor to Admiral Corporation, Chicago, Ill., a corporation of Delaware Application July 10, 1946, Serial No. 682,609

3 Claims. (Cl. 33—143)

This invention relates to measuring apparatus, and more particularly to electronic apparatus for measuring articles or comparing a plurality of articles with a standard article.

The invention, about to be described, will be described in connection with the measurement of articles to determine or compare the size of the article with that of a standard article. It will be appreciated, however, that the apparatus is by no means limited to such use for, as will appear as this description proceeds, the apparatus is adaptable for determining measurements without reference to a standard; for instance, the method and apparatus used can be used to make measurements in the same manner as a standard micrometer is used. The description, therefore, is for the purposes of illustration rather than of limitation.

It is often desirable, especially in factory production, to maintain the size of a certain run of articles within certain limits. Obviously, one manner of effecting this determination could be by measuring the articles with a standard micrometer. The use of micrometers is, however, relatively slow method for measuring articles in quantity production. Therefore, various other means for measuring articles have been proposed, such as the so-called "go" and "no go" gauges, devices using light and other well known expedients. The measurement of articles becomes increasingly difficult in the case of thin wall tubular articles, such as "Bakelite" coil forms, which are often used for supporting the inductances in radio receivers. When these inductances are wound on a coil form, it is highly desirable that the diameter of the forms be maintained within very close tolerance. The tolerance depends on the place where the coil is used; for instance, in the tuning coils for the radio frequency and oscillator circuits of a radio receiver, it is not uncommon, and in many instances essential, for the coil forms to be maintained within the desired size of plus or minus .001 inch. Any deviation beyond this size complicates the circuit alignment problem materially, increasing production costs. These coil forms are also often manufactured from a very flexible material; as a matter of fact, where the forms are extremely thin walled, as in the case where this inductance is designed for permeability tuning control, the wall may be so thin as to preclude the accurate measurement with ordinary means, such as micrometers, or any measuring means which has to exert any pressure on the form, because the contact of the measuring means with the form causes a distortion of the form.

By the present invention, the contact pressure with a coil form may be so small as to avoid this undesirable distortion and still afford an extremely accurate measurement. Furthermore, by the present invention, the apparatus may be set up according to a predetermined standard and the measurements made quickly and accurately in a minimum of time by persons wholly without skill or experience. One single operation not only tells if the size is correct, but whether it is oversize or undersize, and how much it departs from the standard, thus allowing the operator to classify the forms as to size. Furthermore, it is possible to quickly determine if the form is circular or whether it is deformed into an oval formation. The sensitivity of the apparatus may be adjusted so that measurements can be in thousandths or millionths of an inch and the reading made quickly and easily with the utmost degree of accuracy.

All of the foregoing and still other advantages of the invention, as well as the invention itself, will become more apparent from the following description of some embodiments thereof, which description is illustrated by the accompanying drawings and forms a part of this specification.

In the drawings:

Fig. 1 is a circuit diagram of one electronic circuit used in this invention;

Fig. 2 is a side elevational view of a jig used in my circuit;

Fig. 3 is a top plan thereof;

Fig. 4 is an end elevation thereof;

Fig. 5 is a fragmentary section taken on the line 5—5 of Fig. 3;

Fig. 6 is a circuit diagram of another embodiment thereof; and

Fig. 7 is a block diagram of the circuit of Fig. 6.

Throughout the drawings, like parts are illustrated by like reference characters.

Briefly, the invention contemplates the provision of an oscillator circuit which may be adjusted to a predetermined frequency and which may have the frequency varied by the article being measured, and which frequency is reduced to terms of linear measurement in fractions of an inch. It will be appreciated that the measurements may also be made in terms of metric measurement if desirable.

More specifically, I preferably provide an oscillator circuit, the frequency of which is determined by the tuning of the tank circuit, the tuning element of which, by preference, includes a core of finely divided iron commonly known as a permeability tuning slug, of which there are many types available on the market today. The tuning slug is connected to and movable by the movable arm of a jig. The position of the jig arm is determined by the size of the article. The output of the oscillator is amplified in a suitable amplifier to bring the signal up to a predetermined level, after which the signal is passed through a limiter which reduces the signal to a predetermined value, thus eliminating amplified variations. It will be appreciated that the amplifier could be eliminated if the output of the oscillator was of a desired level. The signal from the limiter is fed to a circuit which is sensitive to a change in frequencies, such as a conventional discriminator circuit, and a measuring device in the output of this circuit, calibrated in terms of inches or meters, indicates the size of the article.

An example of a circuit which may be used to carry out the invention is illustrated in Fig. 1. The oscillator circuit is indicated generally at 10 and consists basically of a so-called "Colpitts" oscillator, which includes the parallel tank inductance 12—13, the capacities 14—15, and the tank capacity 16 with the parallel trimmer 16'. Preferably, this circuit is designed to have a high tank capacity and low inductance in the interest of stability of the circuit. The inductance of the coil 13 may be varied by the slug 18 to vary the inductance of this portion of the circuit and enable the sensitivity of the circuit to be adjusted as well as to provide the desired balance. The trimmer capacity 16' is normally provided with a control shaft to facilitate easy access thereto to provide for non-critical adjustment of the circuit as hereinafter more fully described. The slug 19 is connected to and movable by the movable arm of the jig 9. Power is supplied to the circuit from any suitable power supply as indicated at B minus and B plus.

The jig may take various forms and broadly includes a movable lever arm, to one end of which the slug is attached, and the other end of which overhangs in spaced relation to a platform. The articles may be inserted between the free end of the arm and the platform, which determines the tilted relation of the lever arm and hence the position of the slug in the inductance 12.

More specifically, one form of jig which has been found to be very convenient and practical is illustrated in Figs. 2, 3, 4 and 5 and includes a base 22 of generally rectangular formation, and from the mid portion of which rises a pair of spaced bosses 23. The bosses are provided with threaded openings through which pivot screws 24 extend, the inner ends 25 of which are of pointed formation and extend into seats in the side of the lever. The screws are thus adjustable toward the median line of the base and may be held in adjusted position by the lock nuts 26. The pointed ends of the screws thus pivotally support the lever 27 which extends longitudinally of the base 22.

One end of the lever 27 carries an offset bracket 28 which may be of insulating material and extends above the inductance 12. The bracket is provided with a threaded opening for receiving the threaded end of a rod 29 that supports the slug 19. It will be appreciated that the position of the slug is thus adjustable in the lever arm, and hence may be adjusted to any desired position in the coil 12.

The other end of the base is formed to provide a platform or platen 32 of hardened steel having an upwardly extending portion 33. Preferably, the surface of the platen is ribbed as indicated. The form to be measured is adapted to rest on the surface of the ribs of the platen 32 and against the block 33. The lateral edges of the platen slant downward at 34 which facilitates the ease with which the forms being measured may be handled onto and off of the platen.

The free end of the lever 27 overhangs the platen, as best seen in Fig. 3, and carries on its end an article contacting member. The end of the lever is provided with a threaded opening in which is disposed the finely threaded screw 40 having a head 41 on its lower end. The head is adapted to engage the upper side of the coil form and to that end may have the edges rounded or beveled as indicated to facilitate the sliding of the form thereunder. The member 40 is locked in position by a lock nut 43, and the upper end is provided with a knurled head 44 for adjusting its position. The adjustment is preferably of the conventional micrometer type to facilitate accurate adjustments thereof.

The movement of the lever 27 may be limited in both directions. A screw 45 is provided, the free end of which engages the top of the abutment 33 to thus limit the downward movement. Another screw 46 also extends freely through the lever and is threaded into the abutment. The head of the screw engages with the top of the lever and thus determines the upward movement thereof.

The balance of the lever is determined by a weight 47 disposed on an angular arm 48 screwed in the lever to the left of the pivot point, as viewed in Figs. 2 and 3. The weight is ordinarily adjusted so that the platen end of the lever is balanced downward to the limit prescribed by the screw 45, and when the coil form is inserted between the platen and the end 41, the end of the lever is raised, lowering the slug 19 into the coil form.

The oscillator circuit is normally adjusted to provide a relatively high frequency signal. In one mode of operation it is adjusted to deliver a signal of 4.3 megacycles. The range of variation of the signal, and thus the sensitivity of the device, is largely determined by the position of the slug in the coil 13. The greater the inductance in this coil, the less will be the effect of the movable slug in the coil 12.

The desired frequency variation, in this instance, may be as much as 30 kilocycles. It will be appreciated that the amount of frequency variation may also be changed as desired. The output from the oscillator 10 is transferred to the amplifier 50 which may be of any conventional type, designed to provide amplifications for the 4.3 megacycle signal with a band width of at least 30 kilocycles.

The signal is then transferred by the transformer 51, which may be of the permeability tuned type, to a limiter stage 52 wherein all amplitude variations of the signal are removed and the signal is of a predetermined value.

The output of the limiter circuit is supplied to a discriminator circuit through the transformer 53 which includes the primary 54 disposed in the limiter circuit and the secondary 55—56 connected to the anodes of the double diode tube 57. This circuit is tuned in the manner conventional to discriminator circuits, the primary 54 and secondary 55—56 being tuned to the frequency of 4.3 megacycles. This is effected by placing a standard form in position between the platen 32 and the member 41 and adjusting the slug 19 to the desired position. This position may also be varied, depending on the position of the slug for the inductance 13, and determines the sensitivity of the device, as previously stated. During the adjustment, the meter 65 is observed, the adjustment being made to provide zero reading on the meter. The preliminary adjustment being effected, the final adjustment may be effected by the condenser 16'. Preferably, the adjustment of the slug 19 and the condenser 16' is such that when the desired adjustment is realized, the condenser 16' is at a position midway between its maximum and minimum capacity. The control for the condenser 16' may be placed so that it is convenient for subsequent operation and adjustment, to maintain the desired frequency output which, although reasonably stable, may vary in time during the use of the instrument.

The position of the slug in the inductance 13 determines the sensitivity which, in turn, determines the amount of deviation of the signal for a predetermined amount of movement of the slug 19. In other words, if the slug 19 moves .001 inch into or out of the form, the slug in the coil 13 can cause the signal to have greater or less deviation for the same amount of movement. Thus the position of the slug in the coil 13 can be used to determine whether the meter 65 will read in hundredths, thousandths or millionths of an inch. Obviously, where the allowable tolerance in size is greater, the sensitivity may be decreased.

The standard size form having been used to set up the apparatus, a form of known oversize or undersize may be used to make the final check and to determine that the meter 65 is indicating the exact measurement desired.

As previously stated, the signal from the oscillator 10 is amplified in the amplifier stage 50 and is then limited very drastically in the limiter stage 52. This provides a signal in from the output of the limiter which is of constant amplitude in spite of the variations in amplitude in the previous tuned circuits, which variations may occur because of the frequency variation of the signal.

It will be apparent that with a properly designed circuit, the output may be linear with reference to movement of the variable slug, and that thus a standard linear meter may be used and calibrated in decimal fractions of an inch.

Figs. 6 and 7 illustrate another form of the invention embodying the super-heterodyne principle. In this case, there is provided (Fig. 6) a fixed oscillator which is preferably crystal controlled and a tunable oscillator, the signals being mixed in a mixer circuit. From the mixer circuit the signal is passed through 1st and 2nd limiter circuits, thence to the discriminator circuit and the output indicated by a meter in the manner substantially as previously described.

More specifically, the jig 9 is illustrated operatively connected to the slug 19 which is disposed in the oscillator circuit 10 which, in substance, is substantially the same as that previously described. The output of the oscillator circuit 10 is connected to the mixer circuit 100 which includes the multigrid vacuum tube 101.

The fixed oscillator circuit 110 is crystal controlled, the crystal being illustrated at 111 and connected to the tank circuit in a manner well known to those versed in the art.

Suffice to say that the fixed frequency oscillator provides a very stable frequency of predetermined value. The signal therefrom being also supplied to tube 101.

It will be appreciated that the results of feeding two signals of different frequency to the mixer circuit provides a heterodyne frequency which may be of substantially any desired frequency, preferably one that can be easily handled in the subsequent intermediate frequency amplifier 120.

As an example, the crystal controlled oscillator circuit may be designed to provide a frequency of 8 megacycles and the variable oscillator adjusted to provide a frequency of 455 kilocycles lower, which thus provides an intermediate frequency of 455 kilocycles.

This signal is fed through the two triple tuned limiter circuits 120 and 121 where the signal is drastically limited. The second limiter stage is connected to the discriminator primary 123 which is likewise tuned to 455 kc. From the primary, it is transferred to the secondary 124 and thence to the double diode rectifier 125, this portion of the circuit being the conventional discriminator circuit. The output of the discriminator is through the meter 126, a volume control 128 being in series with the meter to adjust the sensitivity.

The tube 130 is an eye tube which is used in tuning up the circuit to indicate when the circuits are properly tuned to the I. F. signal of 455 kc. The meter 126 is preferably a zero center micro ammeter which indicates if the I. F. frequency is high or low and may be calibrated in a like manner to the meter previously described.

The operation of the device is substantially the same as that previously described. With the fixed oscillator operating and the jig slug adjusted to the desired position with a form in place in the jig, the inductance in the variable oscillator is tuned until the eye shows that the proper I. F. frequency is coming through, the I. F. channel having previously been aligned to the I. F. frequency of 455 kc.

The reason that the eye tube is desirable is because the meter 126 indicates deviation in frequency, it being in the output of the discriminator, and therefore cannot indicate the exact I. F. signal. The grid resistance in the eye circuit is so adjusted that the eye closes at limiter level (where limiter action becomes effective) and therefore remains closed when the limiter is operating and will open when the limiter is not operating, and thus enables the operator to determine whether or not the device is operating as it should in the effective portion of the discriminator.

The variable frequency oscillator having been adjusted, the range can also be determined by placing a form of known over or undersize in the jig and observing the reading on the meter. The range or sensitivity may be adjusted by the positions of the tuning slugs; that is, if the tank circuit of the variable frequency oscillator has a high inductance the variation in inductance by the jig controlled slug will have less effect on the circuit, whereas if the inductance is low, the change in the jig tuned slug will provide a greater variation.

It will be noted that with this arrangement the frequencies in the crystal or oscillator circuit and the variable oscillator circuit can be quite high if desired, and that the higher the frequency, the greater the deviation can be obtained, and hence the greater sensitivity. Likewise, a low frequency will deliver a low sensitivity.

It will further be noted that although the frequency in the oscillator circuit is high, the frequencies in the intermediate stage are low, thus making it easier to handle the signal.

The triple tuned I. F. stages provide a flat topped response which is desirable, since the response within the desired limits preferably should not vary in frequency. It will also be apparent that the limiting action is also desirable to prevent the amplitude variances due to tuning resonant circuits from getting through the amplifier.

It will thus be seen that I have provided a circuit which can be used by those having a limited amount of skill to provide exceedingly accurate measurements. The part being measured is not disturbed by the apparatus, the pressure being adjusted to be substantially negligible.

The measurements may be made with great rapidity and with a knowledge as to how much over or under diameter the article being measured departs from the standard.

Having thus described my invention, I am aware that numerous and extensive departures may be made therefrom without departing from the spirit or scope of the invention.

I claim:

1. A measuring jig for use in a circuit having a tunable element for varying the frequency of the circuit the frequency deviation of which, due to the movement of the tuning element, may be indicated, comprising a base, a pair of supports extending upward from the base and a lever arm pivotally supported therebetween, said lever arm being adjustably secured to said tuning element at one end, a platen disposed at the other end of said base under said lever arm and formed with an upwardly facing flat face in its mid portion and downwardly slanting surfaces at the sides, said base being formed with a vertically extending wall at the rear of said platen, a screw threaded in said lever arm and carrying an anvil extending opposite said platen, and means to limit the movement of the lever arm in both directions.

2. A measuring jig for use in a circuit having a tunable element for varying the frequency of the circuit the frequency deviation of which, due to the movement of the tuning element, may be indicated, comprising a base, a pair of supports extending upward from the base and a lever arm pivotally supported therebetween, said lever arm being adjustably secured to said tuning element at one end, a platen disposed at the other end of said base under said lever arm and formed with an upwardly facing flat face in its mid portion and downwardly slanting surfaces at the sides, said base being formed with a vertically extending wall at the rear of said platen, a screw threaded in said lever arm and carrying an anvil extending opposite said platen, said vertically extending wall being formed with vertically extending groove, and said anvil extending into said groove, and means to limit the movement of the lever arm in both directions.

3. A measuring jig for use in a circuit having a tunable element for varying the frequency of the circuit the frequency deviation of which, due to the movement of the tuning element, may be indicated, comprising a base, a pair of supports extending upward from the base and a lever arm pivotally supported therebetween, said lever arm being adjustably secured to said tuning element at one end, a platen disposed at the other end of said base under said lever arm and formed with an upwardly facing flat face in its mid portion and downwardly slanting surfaces at the sides, said base being formed with a vertically extending wall at the rear of said platen, a screw threaded in said lever arm and carrying an anvil extending opposite said platen, said vertically extending wall being formed with a vertically extending groove, and said anvil extending into said groove, and means to limit the movement of the lever arm in both directions, an arm secured to said lever arm and extending upward and above said lever arm substantially parallel to the lever, said arm being threaded and a counterweight adjustably disposed on said arm and adapted to adjust the balance of said lever to determine the force required at said anvil to raise said arm.

NEIL E. WASHBURN.

REFERENCES CITED

The following references are of record in the file of this patent:

UNITED STATES PATENTS

| Number | Name | Date |
| --- | --- | --- |
| 438,300 | Edison | Oct. 4, 1890 |
| 763,011 | Mietaschk | June 21, 1904 |
| 1,835,807 | Parker | Dec. 8, 1931 |
| 1,889,719 | Wende | Nov. 29, 1932 |
| 2,073,913 | Wigan | Mar. 16, 1937 |
| 2,081,738 | Conover | May 25, 1937 |
| 2,115,351 | Terry et al. | Apr. 26, 1938 |
| 2,220,280 | Richards | Nov. 5, 1940 |
| 2,240,278 | Abbott | Apr. 29, 1941 |
| 2,326,427 | Bickel | Aug. 10, 1943 |
| 2,357,569 | Wright et al. | Sept. 5, 1944 |
| 2,387,496 | Cornelius | Oct. 23, 1945 |
| 2,393,717 | Speaker | Jan. 29, 1946 |
| 2,404,238 | Loughlin | July 16, 1946 |
| 2,419,461 | Neff | Apr. 22, 1947 |
| 2,437,639 | Floyd | Mar. 9, 1948 |